Jan. 28, 1969  E. WALASCHEWSKI ET AL  3,423,842
PROCESS FOR CONCENTRATING BY EVAPORATION MIXTURES OF SILICON
DUST OR RESIDUE AND ALKYL OR ARYL CHLOROSILANES
Filed April 26, 1967
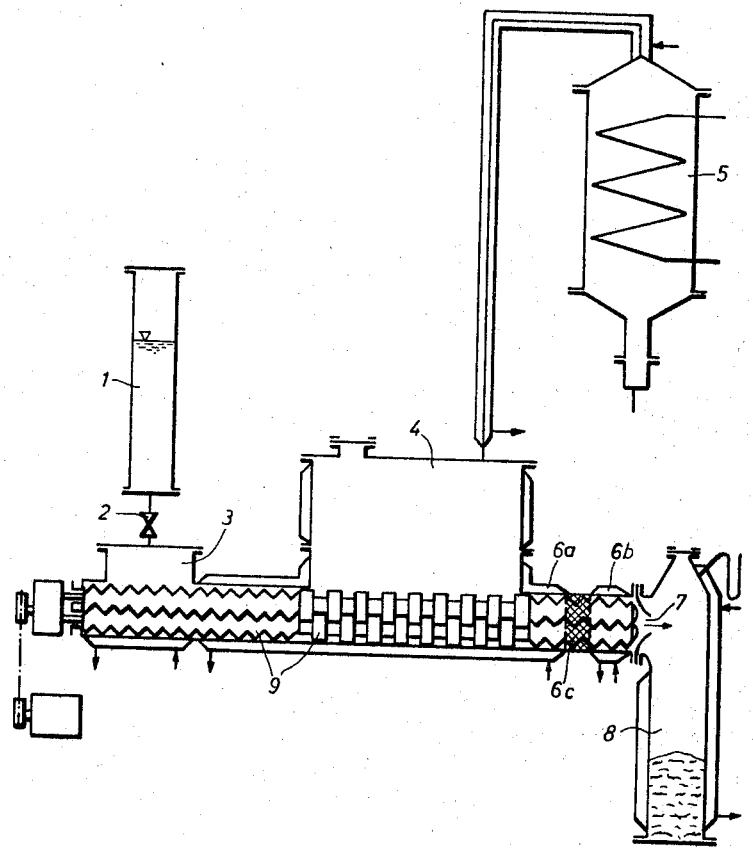
INVENTORS:
ENGELBERT WALASCHEWSKI, HANS HORST STEINBACH, WALTER OETKE, RUDOLF ERDMENGER.
BY
ATTORNEYS

United States Patent Office 3,423,842
Patented Jan. 28, 1969

3,423,842
PROCESS FOR CONCENTRATING BY EVAPORATION MIXTURES OF SILICON DUST OR RESIDUE AND ALKYL OR ARYL CHLOROSILANES
Engelbert Walaschewski, Cologne-Stammheim, Hans-Horst Steinbach, Schildgen, Walter Oetke, Leverkusen, Rudolf Erdmenger, Bergisch Gladbach, Germany, assignors to Farbenfabriken Bayer Aktiengesellschaft, Leverkusen, Germany, a corporation of Germany
Filed Apr. 26, 1967, Ser. No. 633,814
U.S. Cl. 34—14  2 Claims
Int. Cl. F26b 1/00, 5/14

ABSTRACT OF THE DISCLOSURE

Process for evaporating mixtures of silicon dust or residue and alkyl or aryl chlorosilanes using evaporator screws comprising conveying such a mixture through an evaporation chamber in two separate circuits which contact one another in the middle or center of the shaft of the evaporator chamber by providing in the evaporation chamber a four-shaft screw consisting of two parallel pairs of screws, which pairs rotate in opposite directions to one another. There is also provided immediately adjacent the evaporation chamber (in the direction of flow) a heating zone in which the mixture is heated to about 230° C., and thereafter a cooling zone wherein the mixture is cooled to about 100° C. Intermediate the heating and cooling zones there is a so-called plug or sealing zone in which because of the construction of the screws, a plug of material is formed which seals the evaporation chamber off completely from the cooling zone thereby preventing condensation of any polysilane vapors in the cooling zone.

---

The present invention relates to a process for concentrating by evaporation mixtures of silicon dust or residue and alkyl or aryl chlorosilanes, by means of evaporator screws.

When mixtures of this type, are evaporated the surfaces of the screws become covered with a layer of solid material which greatly reduces conduction of heat thereto and hence reduces evaporation. The screws may even break owing to hard incrustations which are formed. Several types of self-cleaning multiple screws are known, but, with them, there is a danger that the pasty material formed during evaporation builds up in the evaporation chamber above the screw, leading to blockages which impair discharge of the polysilane vapors.

It has now been found that these disadvantages can be overcome if the mixture is conveyed through an evaporator chamber in two circuits by means of a four-shaft screw consisting of two parallel pairs of screws, the pairs rotating in opposite directions to each other, and the mixture is concentrated by evaporation only to such an extent that a plastic plug of material impervious to vapor is formed at the discharge end of the screw, before the mouth of the housing for the screw is reached.

The evaporation chamber does not become blocked since the material is carried in two circuits which contact each other at the center of the shaft of the evaporator chamber.

If the evaporation capacity is correctly calculated, it is not even necessary to provide for the material to be evaporated, to be continuously charged to the screw, it being sufficient to supply the material in the form of a sludge, in intermittent batches, a method which is often commercially easy to carry out, and which does not have an adverse effect on the continuous discharge of moist powder. The temperature of the screw is adjusted so that the silicon powder contained in the mixture is not quite evaporated to dryness. The paste transported by the screw to the discharge is cooled to such an extent in the part of the screw immediately before the discharge that a highly viscous, paste is produced, and forms a plug between the inert gas-containing chamber which is under excess pressure and in which evaporation takes place, and the atmosphere. The cooled extruder end of the evaporation apparatus must, of course, be so designed that condensation of the already evaporated silanes cannot take place on the cold surface.

The material, cooled to 100° C., is moved forward by the evaporator screw itself and enters into the atmosphere where is now no longer dangerous in any way and is free from the pungent, irritating odor of the low boiling silanes and polysilanes, and is quite safe to handle.

EXAMPLES (a) Approximately 2 litres of silicon polysilane mixture per hour were charged into an evaporation apparatus equipped with a screw shaft and heated to about 230° C. The shaft had a heat exchange surface of 0.05 m.$^2$. The drive had to be stopped after only 30 minutes because the threads of the screw had become clogged with residue, and supply of further mixture of silicon dust and polysilane into the apparatus was prevented. In addition, there was a build up on residue in the evaporation chamber.

(b) When 3 litres of the same mixture were fed per hour, into a two-shaft apparatus which had a heat exchange surface of 0.1 m.$^2$ the experiments had to be stopped after 2 hours. Although there was a self-cleaning action of the screw shafts against each other, so much residue had formed in the evaporation chamber that when the experiment was continued, the tubular member leading to the condenser was found to be blocked.

In both cases, the experiments were unsatisfactory owing to the formation of residue in the evaporation chamber.

(c) When an evaporator screw was used in which two pairs of screws were arranged in the housing, each pair consisting in known manner of two intermeshing individual screws rotating in the same direction but in the opposite direction to the screws of the other pair, the wall of the housing was kept free from incrustation. No material accumulated in the evaporation chamber.

An apparatus for carrying out the process is illustrated diagrammatically and by way of example in the accompanying drawing.

A screw apparatus 9 comprises, in the direction of flow of material, an end piece comprising a heating zone 6a and cooling zone 6b. The temperature of the heating zone is about 230° C. and that of the cooling zone below 100° C. In the transitional zone, the screws are so constructed that a plug of product 6c is formed. This plug seals the evaporation chamber 4 off from the adjacent cooling zone 6b and thereby prevents condensation of polysilane vapors in the cooling zone.

In order to prevent penetration of air into the apparatus, and hence formation of an explosive mixture of vapor and air, the entire apparatus is maintained at a pressure of below 800 mm. Hg during the experiment. To ensure continuous discharge of residue from the screw, the end piece which includes 6a and 6b is closed by a nozzle plate 7. Each pair of shafts is provided with a nozzle of 15 mm. diameter. The plug of product formed in the nozzles maintains the pressure difference between the vapor chamber and atmosphere. For safety purposes, the nozzles are shielded from the atmosphere by a closed container 8.

In the experiments, about 10 kg. of a mixture of silicon dust and polysilane were charged from a storage vessel 1 through a metering apparatus 2 into the feed hopper 3 of the screw apparatus. At this rate of throughput, the speed of rotation of the screw was 15 r.p.m. The viscous material was conveyed by the screws into the part of the apparatus below the evaporation dome so that distillable constituents evaporated and could escape into condensers 5 through the evaporation chamber 4.

At this time, 5-litre batches of the mixture of silicon dust and polysilane were repeatedly fed into the apparatus over a short period (5 minutes), and further supply was thereafter interrupted for about ½ hour. The separate batches fed into the apparatus were worked up in the apparatus without interruption.

The evaporation process described was carried out over 10 hours. During this time no blockages in the screw nor incrustations or formation of deposits in the evaporation chamber were observed. In addition there were no difficulties in discharging the material through the nozzle.

We claim:

1. Process for evaporating mixtures of silicon dust or residue and alkyl or aryl chlorosilanes using evaporator screws which comprises introducing and conveying the mixture into and through an evaporation zone in two circuits by means of a four shaft screw consisting of two parallel pairs of screws, the pairs rotating in the opposite direction to one another, thereafter conveying the mixture into and through a heating zone in which the mixture is heated to about 230° C. and from said heating zone into a cooling zone wherein the mixture is cooled to about 100° C., maintaining the temperature in said evaporation zone so that a plastic plug of said mixture impervious to vapors is formed intermediate said heating and cooling zones whereby no condensation of vapor formed in said evaporation zone can take place in said cooling zone and discharging the evaporated mixture from said cooling zone 2. Process according to claim 1 which comprises separately collecting the vapors produced in said evaporation zone.

References Cited

UNITED STATES PATENTS

| | | | |
|---|---|---|---|
| 3,118,744 | 1/1964 | Erdmenger et al. | 34—14 X |
| 3,230,865 | 1/1966 | Hibbel et al. | 34—14 X |

JOHN J. CAMBY, *Primary Examiner.*

U.S. Cl. X.R.

264—109, 117, 122, 123; 424—330, 280, 254, 273, 319, 300, 246, 243, 201, 180, 261, 262, 238, 260, 253, 266, 271, 250, 263, 252, 228, 229, 227, 255, 200, 232, 265